United States Patent

Mailaender

(10) Patent No.: US 8,036,257 B2
(45) Date of Patent: Oct. 11, 2011

(54) METHOD OF DETERMINING AT LEAST ONE TRANSMIT MODE PARAMETER FOR A MULTIPLE-INPUT MULTIPLE-OUTPUT SYSTEM

(75) Inventor: Laurence Mailaender, New York, NY (US)

(73) Assignee: Alcatel Lucent, Paris (FR)

(*) Notice: Subject to any disclaimer, the term of this patent is extended or adjusted under 35 U.S.C. 154(b) by 777 days.

(21) Appl. No.: 11/418,183

(22) Filed: May 5, 2006

(65) Prior Publication Data

US 2007/0258537 A1    Nov. 8, 2007

(51) Int. Cl.
*H04B 1/00* (2006.01)
(52) U.S. Cl. ............... 375/148; 375/299; 375/347
(58) Field of Classification Search .............. 375/144, 375/148, 267, 299, 347, 349, 348
See application file for complete search history.

(56) References Cited

U.S. PATENT DOCUMENTS

| | | | | |
|---|---|---|---|---|
| 6,804,312 B1* | 10/2004 | Win et al. | | 375/347 |
| 7,392,012 B2* | 6/2008 | Oh et al. | | 455/39 |
| 2004/0042558 A1* | 3/2004 | Hwang et al. | | 375/267 |
| 2005/0111376 A1* | 5/2005 | Raghothaman et al. | | 370/252 |
| 2005/0157807 A1* | 7/2005 | Shim et al. | | 375/267 |
| 2005/0181739 A1* | 8/2005 | Krasny et al. | | 455/69 |
| 2005/0186921 A1* | 8/2005 | Hoo et al. | | 455/121 |
| 2005/0195912 A1* | 9/2005 | Kim et al. | | 375/267 |
| 2005/0195914 A1* | 9/2005 | Kim et al. | | 375/267 |
| 2005/0215264 A1* | 9/2005 | Subramaniam et al. | | 455/452.2 |
| 2005/0286618 A1* | 12/2005 | Abe | | 375/219 |
| 2005/0286650 A1* | 12/2005 | Han et al. | | 375/267 |
| 2006/0093065 A1* | 5/2006 | Thomas et al. | | 375/299 |
| 2006/0176974 A1* | 8/2006 | Smith et al. | | 375/267 |
| 2006/0203777 A1* | 9/2006 | Kim et al. | | 370/334 |
| 2006/0203894 A1* | 9/2006 | Ventola | | 375/148 |
| 2006/0205356 A1* | 9/2006 | Laroia et al. | | 455/66.1 |
| 2006/0227893 A1* | 10/2006 | Bar-Ness et al. | | 375/267 |
| 2009/0046802 A1* | 2/2009 | Subramaniam et al. | | 375/267 |

* cited by examiner

*Primary Examiner* — Emmanuel Bayard
(74) *Attorney, Agent, or Firm* — Harness, Dickey & Pierce, PLC (57) ABSTRACT

In an embodiment of the method, at least one signal-to-interference-and-noise ratio (SINR) for each antenna configuration in a set of transmission antenna configurations is determined based on an estimated channel characteristic. At least one received signal characteristic is determined for each antenna configuration in the set of antenna configurations based on the determined signal-to-interference-and-noise ratios. One of the antenna configurations in the set of antenna configurations is selected based on the determined received signal characteristics.

26 Claims, 4 Drawing Sheets

METHOD OF DETERMINING AT LEAST ONE TRANSMIT MODE PARAMETER FOR A MULTIPLE-INPUT MULTIPLE-OUTPUT SYSTEM

GOVERNMENT CONTRACT

This invention was made with Government support under Contract W911NF-04-C-0025 awarded by the Defense Advanced Research Projects Agency (DARPA). The Government has certain rights in this invention.

BACKGROUND OF THE INVENTION

The present invention relates to MIMO (multiple-input multiple-output) devices and communications, and more particularly to a method of adapting the number of transmitting antennas in a MIMO wireless link.

MIMO represents an advance in wireless communication. MIMO employs multiple antennas at the transmitting and receiving ends of a wireless link to improve the data transmission rate while holding radio bandwidth and power constant.

A MIMO transmitter transmits an outgoing signal using multiple antennas by demultiplexing the outgoing signal into multiple sub-signals and transmitting the sub-signals from separate antennas. MIMO exploits the multiple signal propagation paths to increase throughput and reduce bit error rates. Each sub-signal reflects off the local environment along its associated signal propagation paths. The spatial richness of the local environment is a function of the uniqueness and distinctness among the different associated signal propagation paths. While multiple signal propagation paths cause interference and fading in conventional radios, MIMO uses these multiple signal propagation paths to carry more information than conventional radio transmissions. Using MIMO techniques it is possible to approximately, linearly increase the rate of transmission, depending on the richness of the local environment.

Figure 1:
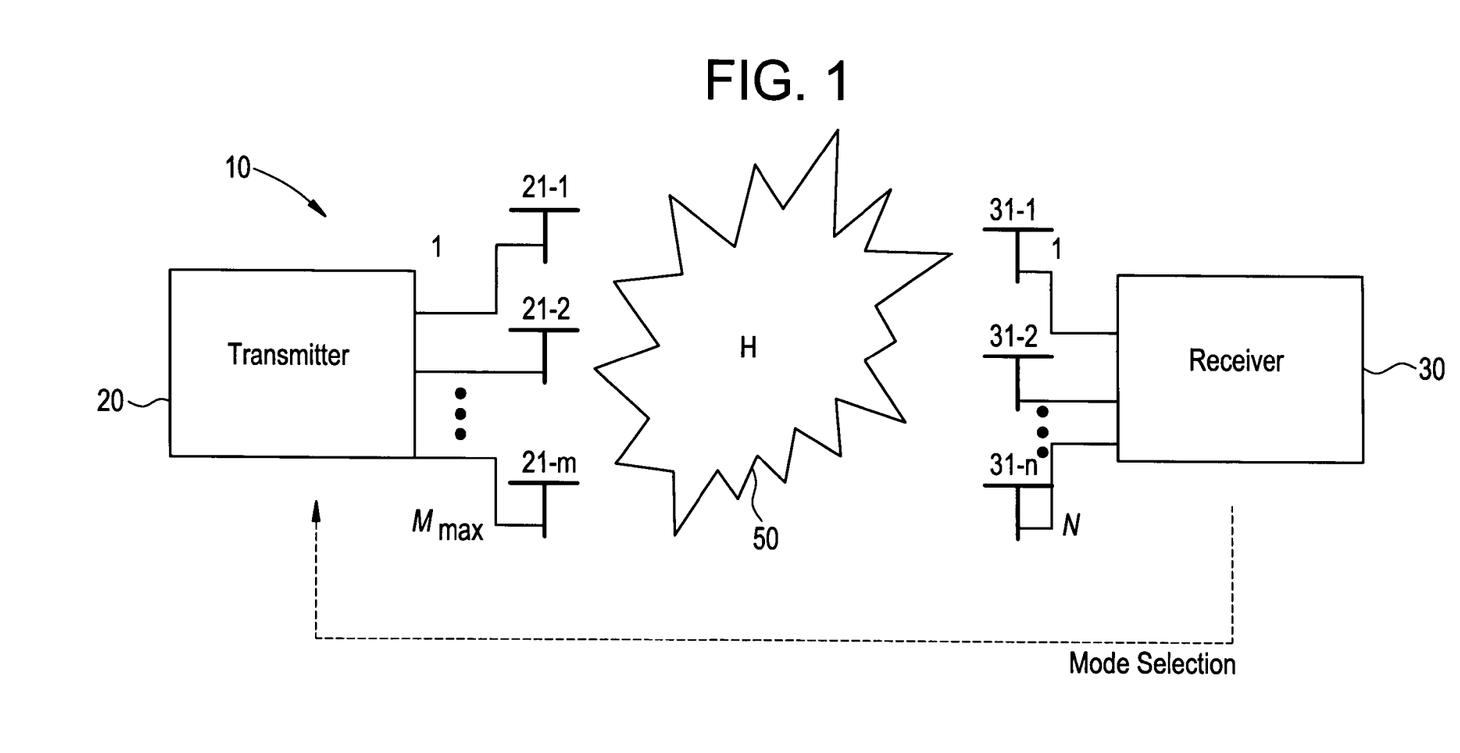
FIG. 1 illustrates an embodiment of a conventional MIMO link employing a frequency division duplex (FDD) system.

FIG. 1 illustrates a basic MIMO wireless link 10, where the transmitter 20 has $M_{max}$ transmitting antennas 21 (21-1 . . . 21-$m$), and the receiving station 30 has N receiving antenna 31 (31-1 . . . 31-$n$), the number of transmitters active at a given moment is M, such that M<=$M_{max}$. A scattering environment 50 with some degree of spatial richness, or statistical independence of fading coefficients, exists between the transmitter and receiver. The H matrix represents the channel connection characteristics (or impulse response) between the transmitting and receiving antennas, 21 and 31, respectively.

In a traditional Frequency Division Duplex (FDD) system, the MIMO receiver must determine M and feed this back to the transmitter on a separate low rate channel, such as mode selection link 40, as shown in FIG. 1. In a Time Division Duplex (TDD) system, no feedback link is necessary, as each end of the communications link can determine the transmission parameters independently.

In the situation where both the transmitter and receiver are stationary, the estimated channel characteristic of the MIMO system remains relatively stable, as does the optimal number of transmission antennas. However, where the transmitter, receiver, or objects in the environment are mobile, the actual channel characteristics of the connection and the spatial richness of the environment can change in response to movement. As the spatial richness of the environment changes, it becomes beneficial to vary the number of active antennas in the MIMO system to optimize the throughput of the wireless transmission. Varying the number of antennas in the MIMO system can offer various benefits including improved transmission rates, reduced interference among sub-signals, lower latency, and reduced power consumption.

For example, as the spatial richness in an environment increases, it may be beneficial to harness the increased variation in the multi-path signal propagation by increasing the number of active antennas. Alternatively, as the spatial richness decreases it may be beneficial to reduce the number of active antennas to avoid potential interference due to the limited signal path variations, and reduce power consumption by using fewer active transmitting antennas, which would otherwise cause interference. Therefore, there exists a need for a method to dynamically alter the number of transmitting antennas in response to, for example, changes in spatial richness.

SUMMARY OF THE INVENTION

In an embodiment of the method, at least one signal-to-interference-and-noise ratio (SINR) for each antenna configuration in a set of transmission antenna configurations is determined based on an estimated channel characteristic. At least one received signal characteristic is determined for each antenna configuration in the set of antenna configurations based on the determined signal-to-interference-and-noise ratios. One of the antenna configurations in the set of antenna configurations is selected based on the determined received signal characteristics.

In one embodiment, the determining at least one SINR step includes determining an effective SINR for each antennas configuration. For example, the determining an effective SINR for each antenna configuration step determines each effective SINR based on SINRs associated with the transmission antennas in the antenna configuration.

The determining at least one received signal characteristic step determines at least one received signal characteristic for each effective SINR. For example, the received signal characteristic may be block error rate.

In one example embodiment, the determining at least one received signal characteristic step applies at least one of the effective SINRs to at least one look-up table to obtain a received signal characteristic.

In another embodiment, the determining at least one received signal characteristic step determines a received signal characteristic for each antenna configuration and at least one additional transmission mode parameter based on the determined effective SINRs. For example, the determining at least one received signal characteristic step may include applying the effective SINRs to look-up tables to obtain the received signal characteristics, each look-up table associated with a different possible combination of additional mode parameter values.

As stated above, the received signal characteristic may be block error rate. Here, the selecting step may include determining figures of merit based on the block error rates and the additional transmission mode parameter values associated with the look-up tables. Each figure of merit is associated with one of the antenna configurations and one of the combinations of additional transmission mode parameter values. The antenna configuration associated with the block error rate producing a best figure of merit is selected, and the additional transmission mode parameter values associated with the best figure of merit are selected. For example, the figure of merit may be throughput, and the additional transmission mode parameters may include at least one of encoding rate and modulation order.

In one embodiment, the selecting step further includes filtering, for each antenna configuration, the block error rates produced from a look-up table based on the determined effective SINRs for the antenna configuration. The determining the figures of merit step determines the figures of merit based on the filtered block error rates and the additional transmission mode parameter values.

BRIEF DESCRIPTION OF THE DRAWINGS

The present invention will become more fully understood from the detailed description given herein and the accompanying drawings, wherein like elements are represented by like reference numerals, which are given by way of illustration only and thus are not limiting of the present invention and wherein.

DETAILED DESCRIPTION OF THE EXAMPLE EMBODIMENTS

As will be described in detail below, the present invention provides embodiments of a transmitter, receiver and method for adapting the MIMO wireless link. In particular, the transmission mode may be adapted. The transmission mode may include an indication of the number of transmitting antennas to use during transmission; the choice of modulation order (e.g., QPSK, 16-QAM, etc.); the encoder rate; the number of CDMA codes (or, OFDM tones, etc); and/or etc.

The present invention may be compatible with any desired method of signal modulation and coding. However, for the purposes of example only, the embodiments of the present invention will be described for a CDMA system using K orthogonal codes.

Figure 2:
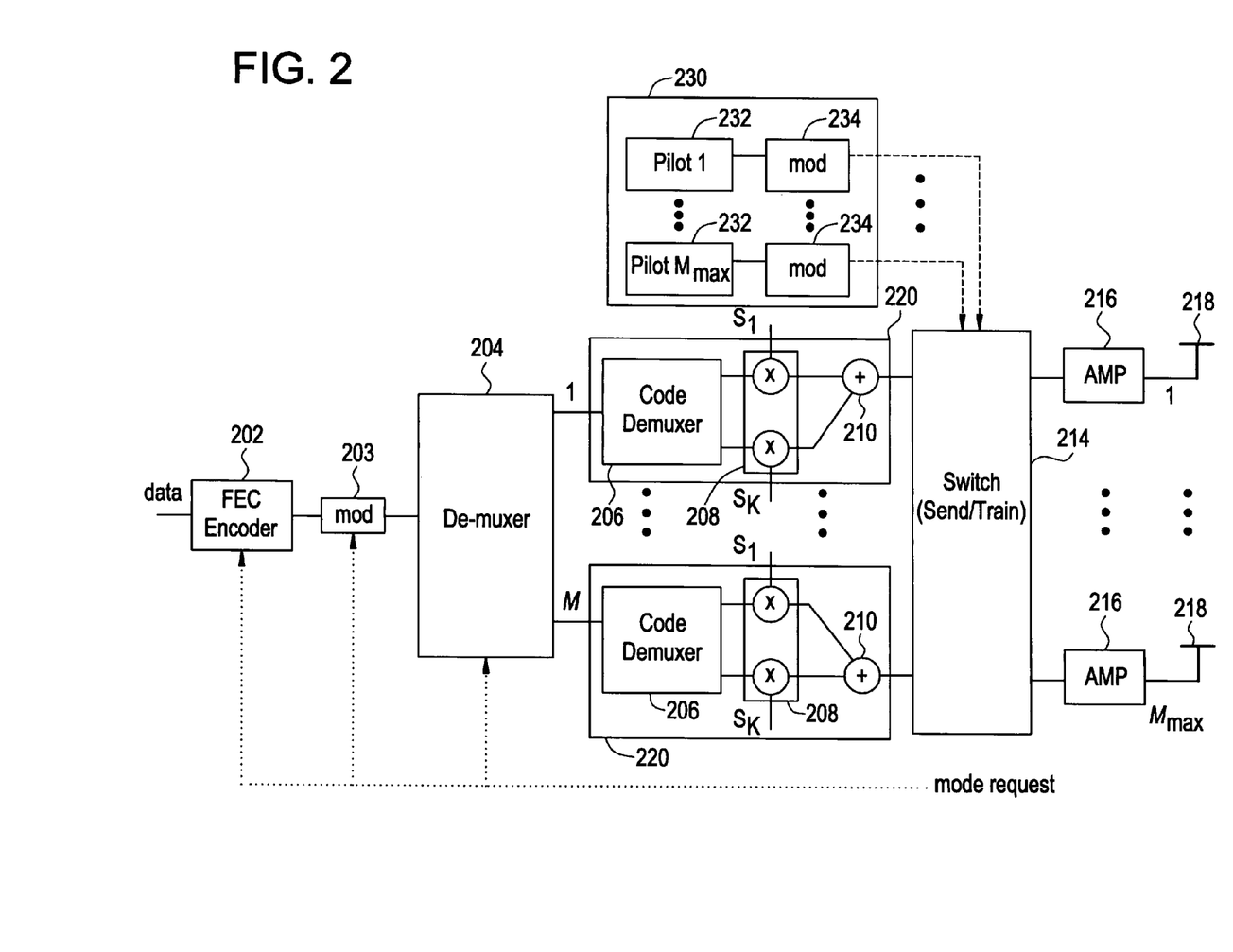
FIG. 2 illustrates a transmitter for a CDMA system according to an example embodiment of the present invention.

FIG. 2 illustrates an example of a MIMO transmitter according to an embodiment of the present invention. As shown, the MIMO transmitter receives a mode request from the MIMO receiver. The mode request indicates the transmission mode requested by the MIMO receiver, and may be received on a separate low-rate control channel by a receiver (not shown) associated with the transmitter. Accordingly, the mode request may indicate the number of transmitting antennas; the choice of modulation order (e.g., QPSK, 16-QAM, etc.); the encoder rate; the number of CDMA codes; and/or etc. For example, the transmission mode may only indicate the number of transmitting antennas to use during transmission.

Based on the mode request, an FEC encoder 202 encodes data for transmission. For example, the FEC encoder 202 encodes the data according to an encoding rate included in the mode request. A modulator 203 modulates the encoded data. For example, the modulators 203 modulate the encoded data based on the modulation order (e.g., QPSK, 16-QAM, etc.) indicated in the mode request.

A demultiplexer 204 demultiplexes the output of the modulator 203 into M streams, where the M is the number of transmitting antennas indicated in the mode request. Which of the Mmax transmitting antennas is used to meet the requested M transmitting antennas may be standardized a priori based on the number M. However, it will be appreciated that this aspect could also be conveyed in the mode request. A plurality of code demultiplexers 206, each associated with one of the M streams, demultiplexes the associated encoded data stream into K code streams. For example, each code demultiplexer 206 demultiplexes the encoded data stream into a number of code streams equal to the number of codes K indicated in the mode request.

A set of multipliers 208 is associated with each demultiplexer 206. Each set of multipliers 208 includes K multipliers, each multiplier being associated with a different one of the K codes $s_i$, for i=1 to K. Each multiplier in a set of multipliers 208 multiplies one of the K code streams by the associated one of the K codes. An adder 210 is associated with each one of the M antennas, and adds together the modulated code streams output from an associated set of multipliers 208. For example, the first adder 210 adds the code streams for code $s_1$ through $s_k$ for transmit antenna 1.

As will be appreciated, the transmitter includes as many code demultiplexers 206, sets of multipliers 208, and adders 210 as the maximum number of transmission antennas Mmax, but will use M of these elements as indicated by the mode request. In particular, each coding and modulation string of code demultiplexer 206, set of multipliers 208, and adder 210 is shown as path 220 in FIG. 2; and each coding and modulation path 220 is associated with a respective one of the Mmax transmission antennas 218. As stated above, the antenna configuration or which transmitting antennas transmit is established a priori according to the number of transmitting antennas indicated in the mode request. Accordingly, this also establishes which of the coding and modulation paths 220 are active for the transmission.

As shown in FIG. 2, a switch 214 selectively transfers the M modulation streams to the respective M of the Mmax antennas 218 via associated amplifiers 216. More specifically, the switch 214 transfers the M modulation streams during a sending mode, but not during a training mode. During a training mode, the switch 214 transfers pilot signals received from a pilot signal generating unit 230.

The pilot signal training unit 230 includes Mmax pilot signal generators 232 and Mmax modulators 234, each associated with one of the pilot signal generators 232. Each pilot signal generator 232 generates a pilot signal, and each modulator 234 modulates the pilot signal output from its associated pilot signal generator 232. The modulated pilot signals are sent to the switch 214 for selective output to the respective Mmax antennas 218 during the training mode. The sending and training modes will be described in more detail below.

Figure 3:
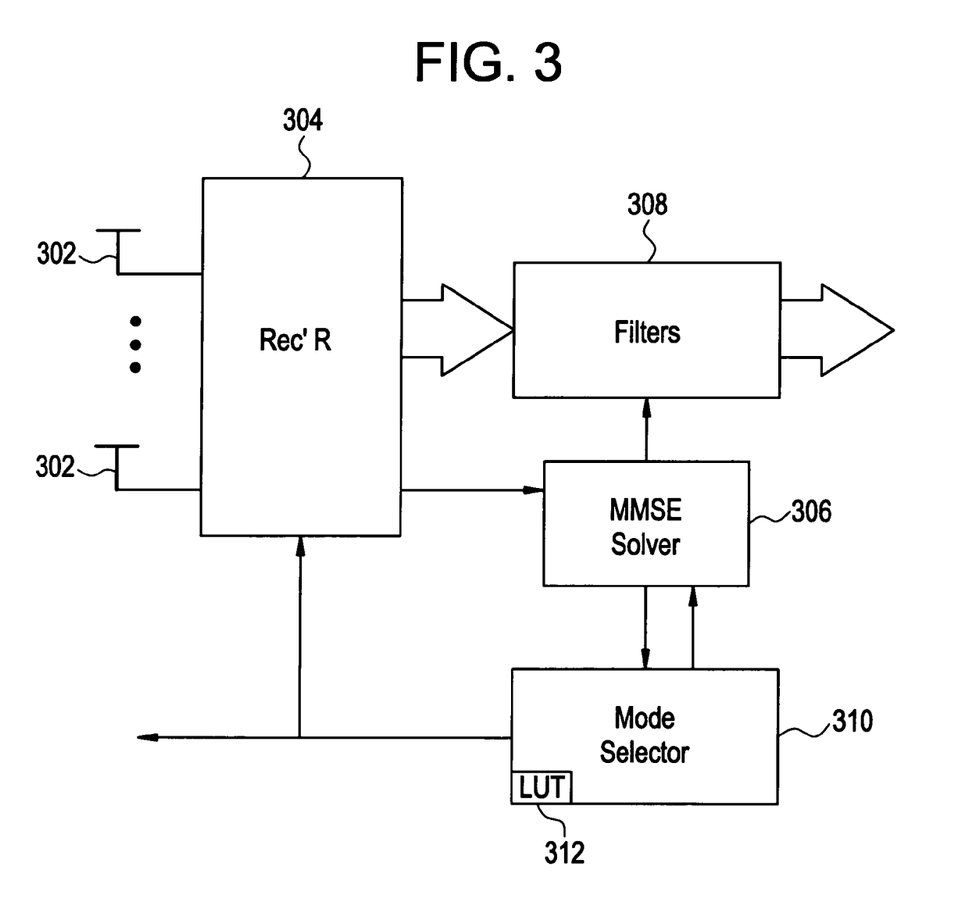
FIG. 3 illustrates a receiver according to an example embodiment of the present invention.

FIG. 3 illustrates an example of a MIMO receiver according to an embodiment of the present invention. As shown, the receiver includes N receive antennas 302 connected to a receiver arrangement 304. For example, the receiver arrangement 304 may be a well-known RAKE receiver. However, the present invention is not limited to this type of receiver arrangement. For the purposes of discussion only, however, it will be assumed that the receiver arrangement 304 is a RAKE receiver. It will also be assumed that L resolvable delays occur in the channel (e.g., air interface between transmitter and receiver) such that the receiver arrangement 304 includes a bank of NLK correlators or RAKE fingers, where N is the number of receive antennas, L is the resolvable delays and K is the number of codes.

As is known, the receiver arrangement 304 demodulates and, for each of the K codes, despreads the signals received over the N antennas 302 to obtain a vector r of N received signals for each of the K codes. As is also well-known, the receiver arrangement 304 estimates the channel characteristic. For example, according to an embodiment of the present invention, the switch 214 enters the training mode and sends the modulated pilot signals, and the receiver arrangement 304 estimates the H matrix (also referred to as the channel characteristic matrix H or channel characteristic H) according to any well-known manner based on the received pilot signals. Many well-known procedures for performing this estimation process exist in the art. For example, the training/estimation operation may be performed periodically such as at the expiration of a time period. As another example, the training/estimation operation may be event driven such as when signal quality changes by a certain amount. The sending of the pilot signals may be heralded on a control channel, may be a pre-amble or mid-amble of an information data packet, may be detected by the format of the pilot signal itself at the receiver, and/or may be the result of synchronized and periodic operation.

A minimum mean square error (MMSE) solver 306 receives the channel characteristic matrix H. As is known, the channel characteristic matrix H includes Mmax rows and N columns, where Mmax is the maximum number of transmitting antennas and N is the number of receiving antennas. More specifically, each row of the channel characteristic H corresponds to one of the transmitting antennas and each column corresponds to one of the receiving antennas. The inventor has recognized that sub-matrices may be formed from channel characteristic H to represent the channel characteristic for different transmitting antenna configurations. As will be recalled, the channel characteristic H is estimated based on pilot signals transmitted by all Mmax of the transmitting antennas. However, different transmission modes use less than all Mmax of the transmitting antennas. Furthermore, two transmission modes may use the same number of transmitting antennas, but differ in which transmitting antennas are used. Accordingly, by removing rows from the channel characteristic H associated with transmitting antennas not forming part of the antenna configuration for a given transmission mode, the channel characteristic sub-matrix sub-H for that antenna configuration may be obtained. In this manner, the MMSE solver 306 may obtain a channel characteristic for each possible transmitting antenna configuration. As discussed above, in one embodiment each possible transmitting antenna configuration may be considered. However, as also discussed above, a single transmitting antenna configuration for different possible numbers of transmitting antennas (or subset of the different possible numbers of transmitting antennas) may be considered. For example, in the case of Mmax=8, the different numbers of transmitting antennas may be 1, 2, 4 and 8; and for each number, a single antenna configuration is established. The antenna configurations will be referred to as the set of antenna configurations. Accordingly, for each antenna configuration in the set, the MMSE solver 306 obtains a channel characteristic to produce a set of channel characteristics.

Next using the channel characteristic for the transmitting antenna configuration of the current transmission mode, the MMSE solver 306 determines a spatial MMSE filter matrix W. This operation will be described in greater detail below. A bank of filters 308 receives the spatial MMSE filter matrix W. The bank of filters 308 includes a filter associated with each one of the codes K. Each filter receives the received signal vector r for the associated code, and applies the spatial MMSE filter W to the received signal vector r to obtain a filtered output stream.

The MMSE solver 306 also generates an effective signal-to-noise plus interference ratio (SINR) for each antenna configuration in the set of antenna configurations based on the associated channel characteristics. This operation will be discussed in more detail below. A mode selector 310 receives the effective SINR for each antenna configuration in the set of antenna configurations. The mode selector uses the effective SINRs as indices to look-up tables (LUTs) 312. Each LUT corresponds to a transmission mode subset exclusive of the number of transmitting antennas. For example, a number of different combinations of encoding rates and modulation orders may be possible. Each LUT corresponds to one possible combination of transmission mode parameter values. For example, for three possible encoding rates and two possible modulation orders, six LUTs will exist—one for each possible combination of the encoding rate and modulation order transmission mode parameters. However, the LUTs may correspond to a single transmission mode parameter exclusive of the number of transmitting antennas. For example, each LUT may correspond to a possible encoding rate.

Based on the inputs, the effective SINRs, a LUT produces a block error rate (BLER) that would be expected for this transmission mode given the effective SINR. For each antenna configuration in the set, the output from each LUT is averaged or filtered over time to remove signal fading effects. For example, for the effective SINRs generated for the antenna configuration of four transmission antennas over time, the output from each respective LUT is averaged or filtered. For each of the filtered outputs from the LUTs 312, the mode selector 310 generates a figure of merit. In one embodiment, the figure of merit is an estimated throughput from the transmitter to the receiver. The transmission mode parameter values associated with the LUT and effective SINR producing the optimal figure of merit (e.g., maximizing throughput) are then selected as the transmission mode by the mode selector 310. It will be appreciated, that a single LUT may exist. In which case, the antenna configuration is the only transmission parameter being selected.

The mode selector 310 then sends the transmission mode to the MMSE solver 306 so that the MMSE solver 306 will know the current mode for subsequent transmissions. The mode selector 310 also sends the transmission mode to the transmitter in a mode request. For example, the receiver may send the transmission mode on a separate low-rate control channel using a transmitter (not shown) associated with the receiver.

Next, the expressions upon which the MIMO link adaptation methodology is based will be described in detail. This will be followed by a description of an embodiment of the MIMO link adaptation methodology as shown in the flow chart of FIG. 4.

As will be understood from the description given above, the receiver arrangement 304 may continually, periodically, or sporadically determine the channel characteristic H. According to an embodiment of the present invention, the MIMO link adaptation methodology is performed periodically, but at a period that is at least an order of magnitude greater than the period at which the receiver arrangement 304 estimates the channel characteristic H. For example, in one embodiment, transmission mode is determined periodically at a period that is two orders of magnitude greater than the period for determining the channel characteristic H.

Next, the relationship between the particular channel characteristics and the resulting signal-to-interference-plus-noise (SINR) ratio will be described. First, consider a flat fading channel. For reference, the SINR of a 1×1 system, conditioned on the channel response, is, $$SINR_{1\times 1} = \frac{|h|^2 A_k^2 G}{\sigma_n^2} \quad (1)$$

where $A_k$ is the average received amplitude (the product of the pathloss, $L_p$, and transmitted amplitude, $\overline{A}_k$) of a single traffic code, h is the scalar channel response, $\sigma_n^2$ is the thermal-plus-interference noise density in the signaling bandwidth and G is the number of chips that the K orthogonal codes span. When the channel is assumed a flat channel, there is no need to account for any inter-code interference, and the denominator is simply due to the external interference and noise. Following equation (1), the symbol energy to noise density ratio is defined as $E_s/N_0 = GA_k^2/\sigma_n^2$.

In a MIMO system, the received vector after despreading any of the K codes is, $$r = Hx + n = H\begin{bmatrix} GA_k d_1 \\ GA_k d_2 \\ \vdots \\ GA_k d_M \end{bmatrix} + n \quad (2)$$

where n is the noise vector, x is the transmitted signal vector, and $d_i$ is the ith data symbol in the transmitted signal vector x. The noise covariance is $E\{n\ n^H\} = \sigma_n^2 G\ I_N$. It is possible to compute all M spatial MMSE filters from the following well-known solution:

$$W = H^H \left(HH^H + \frac{\sigma_n^2}{GA_k^2} I_N\right)^{-1} = \left(H^H H + \frac{\sigma_n^2}{GA_k^2} I_M\right)^{-1} H^H \quad (3)$$

where the spatial filter $w_m$ for stream m is the m-th row of the filter matrix W.

There are two equivalent forms for the MMSE filter, the right-inverse and left-inverse forms. The right inverse form requires inversion of an N×N matrix, while the left inverse requires an M×M matrix. Where there are fewer transmitters, the second form is more computationally efficient.

The filtered output for stream m is:

$$z_m = w_m r = w_m(Hx+n) \quad (4)$$

where $w_m$ is a 1×N row vector, and $h_m$ is the m-th column of H. It is possible to identify the subcomponents of $z_m$ that are due to desired signal, other-stream interference, and noise; and to compute important statistics leading to SINR. The filtered output $z_m$ (for m=1 to M) will be recognized as the output of the filters 308. The transmitted symbol vector, x, can be broken into desired and undesired parts, $[0, \ldots, 0, x_m, 0, \ldots, 0]$ and $[x_1, \ldots, x_{m-1}, 0, x_{m+1}, \ldots, x_M]$. The powers of these three quantities are:

$$S_m = w_m H \text{diag}(0, \ldots, 0, GA_k, 0 \ldots, 0)^2 H^H w_m^H$$

$$I_m = w_m H \text{diag}(GA_k, \ldots, GA_k, 0, GA_k, \ldots, GA_k)^2 H^H w_m^H$$

$$N_m = G\sigma_n^2 w_m w_m^H \quad (5)$$

where the first diagonal matrix has a non-zero entry in the m-th position, and the second diagonal matrix has its only zero entry in the m-th position. These are combined to give an SINR as:

$$SINR_m = \frac{S_m}{I_m + N_m} \quad (6)$$

Now consider the frequency-selective case. Due to the resolvable multi-path, the codes are no longer orthogonal, and inter-code interference cannot be neglected. Starting with a 1×1 system, assume h is the 1×L channel impulse response vector.

First, it is necessary to determine the SINR at the output of a correlator set to the l-th delay. Defining the k-th spreading code at time delay l as the vector, the total transmitted signal is, $$x(t) = \sum_{k=1}^{K} \overline{A}_k d_k s_k(t) \quad (7)$$

The received signal is, $$r(t) = \sum_{l=1}^{L} h_l \sum_{k=1}^{K} A_k d_k s_k(t-l) + n(t) \quad (8)$$

where $A_k = L_p \overline{A}_k$ and $L_p$ is the path loss. Recall that the correlation of non-aligned spreading codes is a random variable with power, $$E\{\langle s_k(t-l), s_k \cdot (t-j)\rangle^2\} = G \quad (l \neq j) \quad (9)$$

The output of the correlator for the l-th delay, $$z_{k,l} = \langle s_k(t-l), r(t)\rangle \quad (10)$$

$$= \left\langle s_k(t-l), \sum_{l'=1}^{L} h_{l'} \sum_{k'=1}^{K} A_{k'} d_{k'} s_{k'}(t-l') + n(t)\right\rangle$$

Following the standard analysis, there will be a desired term, $GA_k h_l d_k$, and added interference from other delays, plus thermal noise. The correlator output can be modeled as a complex Gaussian r.v. with, $$z_{k,l} \sim \eta_c(\mu_{k,l}, \sigma_{k,l}^2), \mu_{k,l} = GA_k h_l d_k, \quad (11)$$

$$\sigma_{k,l}^2 = GP_A \sum_{l' \neq l} |h_{l'}|^2 + G\sigma_n^2$$

where η refers to a Gaussian random variable with mean μ and variance σ, $P_A$ is the power of an individual amplifier, and $h_l$ is the channel response.

In the MIMO case, the SINR is determined at the despreader outputs, including contributions from the other antennas.

The signal transmitted from the m-th antenna is, $$x_m(t) = \sum_{k=1}^{K} \overline{A}_k d_{k,m} s_k(t) \quad (12)$$

The signal received at the n-th antenna has contributions from all M transmitters, $$r_n(t) = \sum_{m=1}^{M} \sum_{l=1}^{L} (H_l)_{n,m} \sum_{k'=1}^{K} A_{k'} d_{k',m} s_{k'}(t-l) + n_n(t) \quad (13)$$

Since this is MIMO, the equation includes the H matrix of size NLM.

Despread the n-th received signal with the k-th code at the l-th delay, the calculation becomes:

$$z_{n,l,k} = \langle s_k(t-l), r_n(t) \rangle \quad (14)$$

$$= \left\langle s_k(t-l), \sum_{m=1}^{M} \sum_{l'=1}^{L} (H_{l'})_{n,m} \sum_{k'=1}^{K} A_{k'} d_{k',m} s_{k'}(t-l') + n_n(t) \right\rangle$$

One can see there is a desired term, and an interference plus noise term, $$\mu_{n,l,k} = GA_k \sum_{m=1}^{M} (H_l)_{n,m} d_{k,m} \quad (15)$$

$$\sigma_{n,l,k}^2 = P_A G \sum_{l' \ne l} \sum_{m=1}^{M} |(H_{l'})_{n,m}|^2 + G\sigma_n^2 \quad (16)$$

Using this description, we can see the composite model for the received signal of the kth code output from the receiver arrangement 304, when the receiver arrangement 304 is a RAKE receiver, is:

$$r_k = \begin{bmatrix} H_1 \\ H_2 \\ \vdots \\ H_L \end{bmatrix} \begin{bmatrix} GA_k d_{k,1} \\ GA_k d_{k,2} \\ \vdots \\ GA_k d_{k,M} \end{bmatrix} + \begin{bmatrix} n_{1,1,k} \\ n_{2,1,k} \\ \vdots \\ n_{N,L,k} \end{bmatrix} \quad (17)$$

where $\text{Var}(n_{n,l,k}) = \sigma_{n,l,k}^2$ defined in (16). For shorthand, define $\overline{H} = [H_1^T, \ldots, H_L^T]^T$. Equation (17) is of the same form as (2), so we can find the SINR as was done previously, but using $\overline{H}$ and the new noise variance. The diagonal matrix is defined as:

$$D_k = \text{diag}(\sigma_{1,l,k}^2, \sigma_{2,l,k}^2, \ldots \sigma_{N,L,k}^2) \quad (18)$$

of dimension NL×NL. The values of (16) are actually independent of k, so it is possible to drop the subscript and use the same diagonal matrix for all K codes. (This approximation is justified for K>>1.) The spatial MMSE filter matrix solution now has the form:

$$W = \overline{H}^H \left( \overline{H} \overline{H}^H + \frac{1}{G^2 A_k^2} D \right)^{-1} \quad (19)$$

$$= \left( \overline{H}^H D^{-1} \overline{H} + \frac{1}{G^2 A_k^2} I_M \right)^{-1} \overline{H}^H D^{-1}$$

and the spatial filter for substream m is the m-th row. As before, it is possible to apply this spatial filter to obtain filter streams, and to obtain SINR values. The S, I and N may for an mth stream may be computed as:

$$S_m = w_m \overline{H} \text{diag}(0, \ldots, 0, GA_k, 0 \ldots, 0)^2 \overline{H}^H w_m^H$$

$$I_m = w_m \overline{H} \text{diag}(GA_k, \ldots, GA_k, 0, GA_k, \ldots, GA_k)^2 \overline{H}^H w_m^H$$

$$N_m = w_m D w_m^H \quad (20)$$

Figure 4:
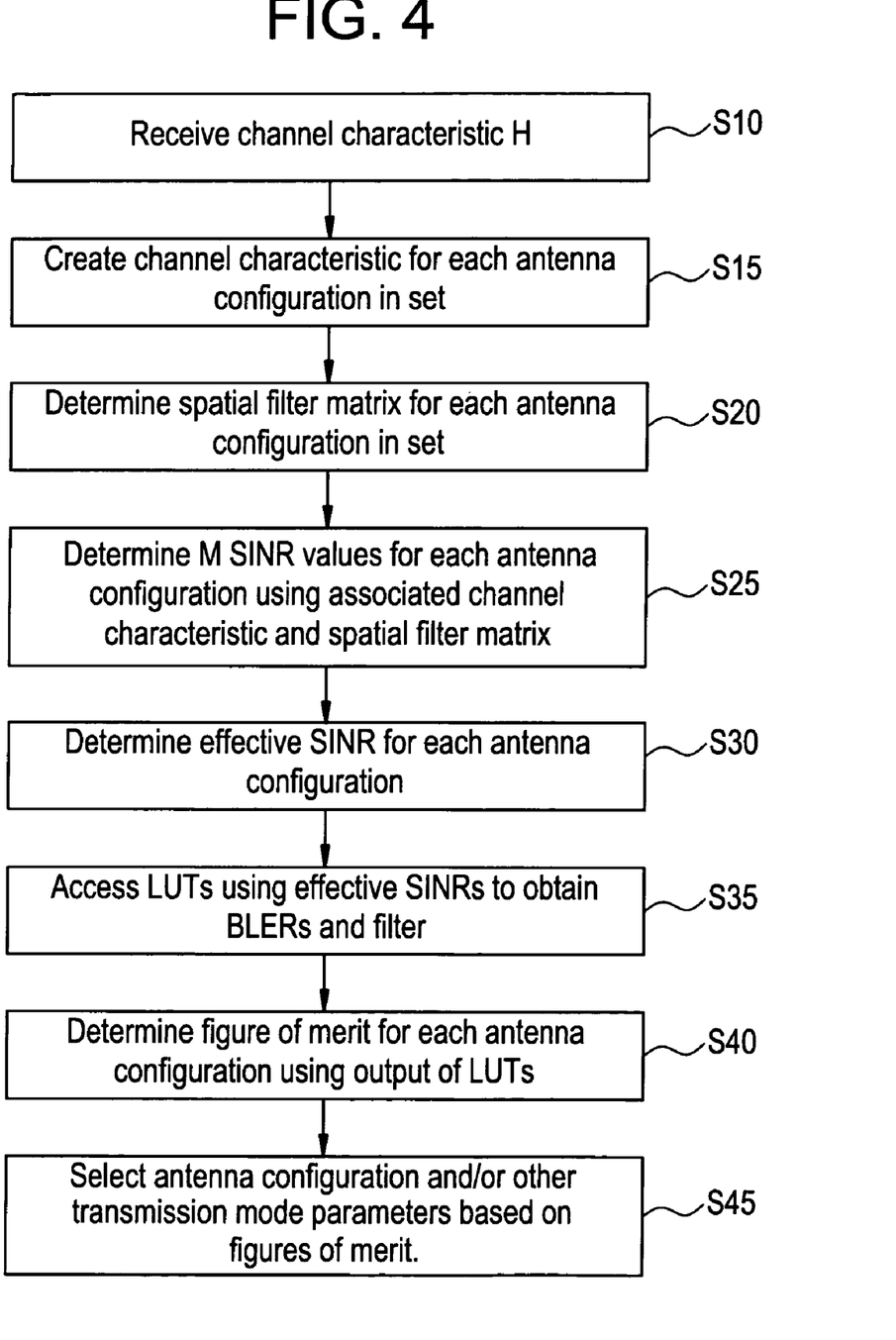
FIG. 4 illustrates a flow chart of an example method for selecting a transmission mode in accordance with an example embodiment of the present invention.

Having laid the mathematical foundation for the method according to the present invention, the MIMO link adaptation methodology according to an embodiment of the present invention will now be described with reference to the flow chart of FIG. 4 and as being implement by the receiver of FIG. 3.

As shown, in step S10 the MMSE solver 306 receives the estimated channel characteristic H from the receiver arrangement 304. Then in step S15, the MMSE solver 306 generates sub-matrices from the channel characteristic H to create a set of channel characteristics, each member of the set being associated with a different antenna configuration. As discussed above, in one embodiment each possible transmitting antenna configuration may be considered. However, as also discussed above, a single transmitting antenna configuration for different possible numbers of transmitting antennas (or subset of the different possible numbers of transmitting antennas) may be considered.

In step S20, the MMSE solver 306 generates the spatial filter matrix W for each channel characteristic in the set of channel characteristics using equations (3) or (19). Stated another way, a spatial filter matrix W is generated for each antenna configuration represented by the set of channel characteristics. In generating the spatial filter matrices, the MMSE solver 306 also uses knowledge of the average received amplitude for any of the codes K. Because, as is known, this is a scale factor related to the pilot strength determined during the channel estimation, the MMSE solver 306 receives this value from the receiver arrangement 304. As was discussed above, the value of W is independent of the codes K.

The MMSE solver 306 then, in step S25, determines M SINR values for each substream of a given antenna configuration according to equations (5)-(6) or (20) and (6).

To review, each antenna configuration in the set has an associated channel characteristic, spatial filter matrix and set of M SINR values. In step S30, an effective SINR is determined for each antenna configuration based on the associated set of M SINR values. Namely, considering coding across M channels, each characterized by $SINR_m$, the total capacity for this channel is equated to the capacity of a single "effective" channel via, $$\frac{1}{M} \sum_{m=1}^{M} \log_2(1 + SINR_m) \stackrel{\Delta}{=} \log_2(1 + \rho_{\mathit{eff}}) \quad (21)$$

Solving for the effective SINR $\rho_{\mathit{eff}}$ gives, $$\rho_{\mathit{eff}} = \left( \prod_{m=1}^{M} (1 + SINR_m) \right)^{1/M} - 1 \quad (22)$$

The effective SINR values are sent to the mode selector 310, which uses the effective SINRs as inputs to the look-up tables (LUTs) 312 in step S35. As discussed above, the mode selector 310 uses the effective SINRs as indices to the LUTs 312. Each LUT corresponds to a transmission mode subset exclusive of the number of transmitting antennas. For example, a number of different combinations of encoding rates and modulation orders may be possible. Each LUT corresponds to one possible combination. For example, for three possible encoding rates and two possible modulation orders, six LUTs will exist—one for each possible combination of the encoding rate and modulation order transmission mode parameters. However, the LUTs may correspond to a single transmission mode parameter exclusive of the number of transmitting antennas. For example, each LUT may correspond to a possible encoding rate.

Based on the inputs, the effective SINRs, a LUT produces a block error rate (BLER) that would be expected for this combination of transmission mode parameter values given the effective SINR. For each antenna configuration in the set, the output from each LUT is averaged or filtered over time to remove signal fading effects. For example, for the effective SINRs generated for the antenna configuration of four transmission antennas over time, the output from each respective LUT is averaged or filtered. For example, a simple averaging of the most recent 3, 5 or 7 BLER outputs from a LUT for an antenna configuration may be performed. For each of the filtered outputs from the LUTs 312, the mode selector 310 generates a figure of merit in step S40. In one embodiment, the figure of merit is an estimated throughput from the transmitter to the receiver. The transmission mode parameters associated with the LUT (e.g., encoding rate, modulation order, etc.) and the effective SINR (e.g., the antenna configuration) producing the optimal figure of merit (e.g., maximizing throughput) are then selected as the transmission mode by the mode selector 310. It will be appreciated, that a single LUT may exist. In which case, the antenna configuration is the only transmission parameter being selected.

As stated, in one embodiment, the figure of merit f is chosen to be the throughput, which is defined as follows:

$$f = \log_2(O_f) R_c(f)(1 - BLER(f)) \quad (23)$$

where $O_r$, $R_c(r)$, BLER(r) are the modulation order, code rate, and BLER associated with discrete rate, r. The mode that optimizes the figure of merit is selected in step S45. For example, the optimal figure of merit, $f_{best}$, may be defined here as:

$$f_{best} = \arg\max_f \log_2(O_f) R_c(f)(1 - BLER(f)). \quad (24)$$

In this example, the best figure of merit is the highest figure of merit. As will be appreciated, the figure of merit may be defined such that the smallest figure of merit is preferable. Also, instead of producing a figure of merit related to throughput, a different metric may be used.

As will be appreciated, if only the antenna configuration was being determined as the transmission mode, then equations (23) and (24) would be reduced to including only the BLER portion of the equations.

While a majority of the analysis presented has been for the case of a CDMA system with a rake receiver arrangement, it will be appreciated that any linear receiver can be accommodated. For example, if a chip-level linear MMSE equalizer is used, it is only necessary to expand the set of delays in the weight vector to exceed the channel duration by a suitable factor. Similarly, the present invention may also be applied to an OFDM system.

With some embodiments of the present invention having thus been described, it will be obvious that the same may be varied in many ways. Such variations are not to be regarded as a departure from the spirit and scope of the present invention, and all such modifications are intended to be included within the scope of the present invention.

I claim:

1. A method of determining a number of transmission antennas, each antenna configured to transmit independent information, for a code division multiple access (CDMA) multiple-input-multiple-output (MIMO) system having a plurality of CDMA codes, comprising:
   determining, by a network element, at least one effective signal-to-interference-and-noise ratio (SINR) for each antenna configuration in a set of antenna configurations based on a minimum mean squared error (MMSE) filter independent of the plurality of CDMA codes, the MMSE filter being based on an estimated channel characteristic, each antenna configuration including a different number of transmission antennas;
   determining at least one received signal characteristic for each determined effective SINR; and
   selecting one of the antenna configurations in the set of antenna configurations based on the determined received signal characteristics.

2. The method of claim 1, wherein the determining an effective SINR for each antenna configuration determines each effective SINR based on SINRs associated with the transmission antennas in the antenna configuration.

3. The method of claim 1, wherein the received signal characteristic is block error rate.

4. The method of claim 1, wherein the determining at least one received signal characteristic applies at least one of the effective SINRs to at least one look-up table to obtain a received signal characteristic.

5. The method of claim 1, wherein the selecting comprises:
   determining a transmission throughput associated with each antenna configuration based on the received signal characteristic; and
   selecting the antenna configuration associated with a highest determined throughput.

6. The method of claim 1, wherein the determining at least one received signal characteristic determines a received signal characteristic for each antenna configuration and at least one additional transmission mode parameter based on the determined effective SINRs.

7. The method of claim 6, wherein the determining at least one received signal characteristic comprises:
   applying the effective SINRs to look-up tables to obtain the received signal characteristics, each look-up table associated with a different possible combination of additional transmission mode parameter values.

8. The method of claim 7, wherein the received signal characteristic is block error rate.

9. The method of claim 8, wherein the selecting comprises:
   determining figures of merit based on the block error rates and the additional transmission mode parameter values associated with the look-up tables, each figure of merit associated with one of the antenna configurations and one of the combinations of additional transmission mode parameter values; and
   selecting the antenna configuration associated with the block error rate producing a best figure of merit; and
   selecting the additional transmission mode parameter values associated with the best figure of merit.

10. The method of claim 9, wherein the figure of merit is throughput.

11. The method of claim 9, wherein the additional transmission mode parameters include at least one of encoding rate and modulation order.

12. The method of claim 9, wherein the selecting further comprises:
filtering, for each antenna configuration, the block error rates produced from a look-up table based on the determined effective SINRs for the antenna configuration; and wherein
the determining the figures of merit determines the figures of merit based on the filtered block error rates and the additional transmission mode parameter values.

13. The method of claim 1, wherein the determining at least one received signal characteristic determines a received signal characteristic for each determined effective SINR and at least one additional transmission mode parameter based on the determined effective SINRs.

14. The method of claim 13, wherein the determining at least one received signal characteristic comprises:
obtaining at least one received signal characteristic from a look-up table using the determined effective SINRs, each look-up table associated with a different possible combination of additional transmission mode parameter values.

15. The method of claim 14, wherein the received signal characteristic is block error rate.

16. The method of claim 15, wherein the selecting comprises:
determining figures of merit based on the block error rates and the additional transmission mode parameter values associated with the look-up tables, each figure of merit associated with one of the antenna configurations and one of the combinations of additional transmission mode parameter values; and
selecting the antenna configuration associated with the block error rate producing a best figure of merit; and
selecting the additional transmission mode parameter values associated with the best figure of merit.

17. The method of claim 16, wherein the figure of merit is throughput.

18. The method of claim 16, wherein the additional transmission mode parameters include at least one of encoding rate and modulation order.

19. The method of claim 16, wherein the selecting further comprises:
filtering, for each antenna configuration, the block error rates produced from a look-up table based on the determined effective SINRs for the antenna configuration; and wherein
the determining the figures of merit determines the figures of merit based on the filtered block error rates and the additional transmission mode parameter values.

20. The method of claim 1, wherein the set of antenna configurations includes only one configuration for each number of transmission antennas.

21. The method of claim 20, wherein each antenna configuration in the set of antenna configuration is predetermined.

22. A method of determining transmitter parameters including a number of active transmit antennas, for a code division multiple access (CDMA) Multiple-Input-Multiple-Output (MIMO) system having a plurality of CDMA codes, with each antenna configured to transmit independent information, the method comprising:
determining, by a receiving element, at least one effective signal-to-interference-and-noise ratio (SINR) for each transmission antenna configuration in a set of transmission antenna configurations based on a minimum mean squared error (MMSE) filter independent of the plurality of CDMA codes, the MMSE filter being based on an estimated channel characteristic, each transmission antenna configuration including a different number of transmission antennas;
determining at least one received figure of merit for each determined effective SINR; and
selecting one of the transmission antenna configurations in the set of transmission antenna configurations based on the determined figures of merit, the selected transmission antenna configuration identifying the number of active transmission antennas of the transmission antennas.

23. The method of claim 22, further comprising:
transmitting the selected transmission antenna configuration to a transmitter in the MIMO system.

24. The method of claim 22, wherein the determining figures of merit includes,
applying the effective SINRs to look-up tables to obtain the figures of merit, each look-up table associated with a different combination of transmission mode parameter values.

25. The method of claim 24, wherein the selecting one of the transmission antenna configurations includes,
selecting the antenna configuration and transmission mode parameters values associated with a best figure of merit.

26. A method of determining transmitter parameters including a number of active transmit antennas, for a single-user Multiple-Input-Multiple-Output (MIMO) system having a plurality of codes, with each antenna configured to transmit independent information, the method comprising:
determining, by a receiving element, at least one effective signal-to-interference-and-noise ration (SINR) for each transmission antenna configuration in a sit of transmission antenna configurations based on a minimum mean squared error (MMSE) filter independent of the plurality of codes, the MMSE filter being based on an estimated channel characteristic, each transmission antenna configuration including a different number of transmission antennas;
determining at least one received figure of merit for each determined effective SINR; and
selecting one of the transmission antenna configurations in the set of transmission antenna configurations based on the determined figures of merit, the selected transmission antenna configuration identifying the number of active transmission antennas of the transmission antennas.

* * * * *